(12) United States Patent
Yumoto et al.

(10) Patent No.: US 10,259,686 B2
(45) Date of Patent: Apr. 16, 2019

(54) MAGNET WORK MACHINE

(71) Applicant: KOBELCO CONSTRUCTION MACHINERY CO., LTD., Hiroshima-shi (JP)

(72) Inventors: Natsuki Yumoto, Hiroshima (JP); Nobuhiro Koga, Hiroshima (JP); Hideki Yoshihara, Hiroshima (JP); Yoshitsugu Tamura, Tokyo (JP); Yoshifumi Asai, Tokyo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/735,854

(22) PCT Filed: Jun. 14, 2016

(86) PCT No.: PCT/JP2016/067711
§ 371 (c)(1),
(2) Date: Dec. 12, 2017

(87) PCT Pub. No.: WO2016/204155
PCT Pub. Date: Dec. 22, 2016

(65) Prior Publication Data
US 2018/0179026 A1    Jun. 28, 2018

(30) Foreign Application Priority Data

Jun. 15, 2015 (JP) .................................. 2015-120553

(51) Int. Cl.
*H01F 7/06* (2006.01)
*H02P 3/18* (2006.01)
(Continued)

(52) U.S. Cl.
CPC ................ *B66C 1/08* (2013.01); *B66C 13/22* (2013.01); *H01F 7/064* (2013.01); *H02P 3/18* (2013.01); *H02P 9/02* (2013.01); *B66C 2700/087* (2013.01)

(58) Field of Classification Search
USPC .................................................. 322/7; 701/22
See application file for complete search history.

(56) References Cited

U.S. PATENT DOCUMENTS 7,818,111 B2 * 10/2010 Fujishiro .................. B60K 6/26
                                                    701/99
8,639,404 B2 *  1/2014 Sugiyama ................ B60K 6/12
                                                    701/22
(Continued)

FOREIGN PATENT DOCUMENTS

CN        101990505 A    3/2011
CN        102070069 A    5/2011
(Continued)

OTHER PUBLICATIONS

Extended European Search Report dated Apr. 16, 2018 in European Patent Application No. 16811629.1 citing document AA therein, 6 pages.
(Continued)

*Primary Examiner* — Pedro J Cuevas
(74) *Attorney, Agent, or Firm* — Oblon, McClelland, Maier & Neustadt, L.L.P.

(57) ABSTRACT

Simplification of a device configuration and control is realized, which enables attraction and release by a magnet without using a battery. A magnet work machine includes a generator motor (8) driven by an engine (7); and an inverter (10) which controls a magnet (6) and the generator motor (8) such that the magnet (6) is energized by electric power from the generator motor (8) to attract metal scraps or the like, and during demagnetization for releasing metal scraps or the (Continued)

like, electric power applied to the magnet (6) is transmitted to the generator motor (8) as regenerative power so as to be consumed. The inverter (10) determines a torque of the generator motor (8) as a motor according to a voltage change of a main circuit based on a detected main circuit voltage so as to suppress the voltage change, and gives the torque as a command.

4 Claims, 6 Drawing Sheets

(51) Int. Cl.
*B66C 1/08* (2006.01)
*H02P 9/02* (2006.01)
*B66C 13/22* (2006.01)

(56) References Cited

U.S. PATENT DOCUMENTS

| | | | | |
|---|---|---|---|---|
| 8,818,648 | B2* | 8/2014 | Takanashi | E02F 9/268 |
| | | | | 701/50 |
| 9,108,516 | B2* | 8/2015 | Sugiyama | B60K 6/12 |
| 9,127,441 | B2* | 9/2015 | Sakamoto | H02M 7/003 |
| 9,725,008 | B2* | 8/2017 | Wu | B60K 6/48 |
| 2011/0251746 | A1* | 10/2011 | Wu | B60K 6/48 |
| | | | | 701/22 |
| 2012/0130576 | A1* | 5/2012 | Sugiyama | B60K 6/12 |
| | | | | 701/22 |
| 2012/0325568 | A1 | 12/2012 | Takeo | |
| 2014/0107881 | A1* | 4/2014 | Sugiyama | B60K 6/12 |
| | | | | 701/22 |
| 2017/0335547 | A1* | 11/2017 | Wu | E02F 9/2246 |

FOREIGN PATENT DOCUMENTS

| | | |
|---|---|---|
| CN | 102134867 A | 7/2011 |
| JP | 2002-359112 A | 12/2002 |
| JP | 2005-1775 | 1/2005 |
| JP | 2007-182302 A | 7/2007 |
| JP | 2009-215054 A | 9/2009 |
| JP | 2010-24043 A | 2/2010 |
| JP | 2012-51723 A | 3/2012 |

OTHER PUBLICATIONS

International Search Report dated Sep. 13, 2016 in PCT/JP2016/067711 filed Jun. 14, 2016.

* cited by examiner

MAGNET WORK MACHINE

TECHNICAL FIELD

The present invention relates to a magnet work machine including a magnet (electromagnet; referred to as "lifting magnet" or abbreviated as "lifmag") attached to a front end of a work attachment, and a generator motor which supplies electric power to energize the magnet.

BACKGROUND ART

A magnet work machine for attracting metal scraps or the like by a magnet (commonly called "lifmag machine") includes, as a main body, a hydraulic excavator including a self-propelled base machine 3 having a lower travelling body 1 and an upper slewing body 2, and a work attachment A having a boom 4 attached to the base machine 3 and an arm 5 as shown in FIG. 6. Additionally, the magnet work machine, which includes a magnet 6 mounted on a front end of the work attachment A (at a front end of the arm 5 as shown in the figure, or at a bucket not shown), carries metal scraps or the like, with the metal scraps or the like being attracted to the magnet 6.

As the magnet work machine, there is known a hybrid work machine which includes an engine, a generator motor driven by the engine, and a battery, and operates a magnet with the battery as a power supply (see Patent Literature 1).

In the known technique, electric power generated by the generator motor is transmitted to the battery to charge the battery, and the electric power stored in the battery is transmitted to the magnet to energize the magnet. On the other hand, during demagnetization, i.e., when electric power supply from the battery to the magnet is cut off in order to release charges attracted to the magnet, the electric power supplied to the magnet is recovered (regenerated) in the battery.

According to the battery-driven system, electric power supply and regeneration for attraction and release by a magnet is conducted only between the battery and the magnet. Therefore, the system has an advantage that a voltage of a main circuit (a main circuit voltage) connecting the magnet and a power supply does not have a large fluctuation.

However, the above known technique has a large disadvantage. Specifically, essential provision of a battery complicates a device configuration, thus increasing costs and space for facilities. Further, control for maintaining a battery charging rate to be appropriate for attraction and release and control for making a battery temperature constant are required to complicate the control.

CITATION LIST

Patent Literature

Patent Literature 1: JP 2005-1775 A

SUMMARY OF INVENTION

An object of the present invention is to provide a magnet work machine which is capable of attraction and release by a magnet without using a battery and which realizes simplification of a device configuration and control.

As means for solving the above problem, the present invention provides a magnet work machine including an engine as a power source; a generator motor driven by the engine to function as a generator; a magnet having an attraction function and a release function realized by energization and demagnetization using the generator motor as a power supply; and a controller which conducts control of the generator motor and the magnet including transmission/reception of electric power between the generator motor and the magnet, in which the controller is configured to transmit electric power applied to the magnet to the generator motor during demagnetization of the magnet so as to allow the generator motor to consume the electric power as regenerative power.

The present invention enables attraction and release by a magnet without using a battery and realizes simplification of a device configuration and control.

DESCRIPTION OF EMBODIMENTS

In the following, an embodiment of the present invention will be described with reference to the accompanying drawings. The embodiment below is one example of implementation of the present invention, and is not to be construed as limiting a technical range of the present invention.

The embodiment of the present invention will be described with reference to FIG. 1 to FIG. 5.

Figure 1:
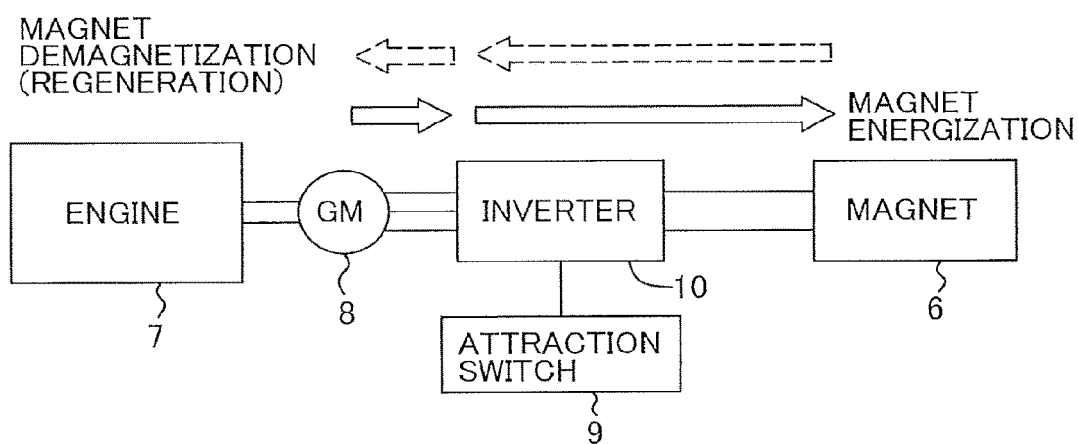
FIG. 1 is a system configuration diagram of a magnet work machine according to an embodiment of the present invention.

FIG. 1 is a system configuration diagram of a magnet work machine according to the embodiment.

As shown in the figure, the magnet work machine includes an engine 7 as a power source, a generator motor 8 driven by the engine 7 to function as a generator, an attraction switch 9, an inverter 10, and a magnet 6.

When the attraction switch 9 is operated to an attraction side, electric power generated in the generator motor 8 is supplied to the magnet 6 via the inverter 10 as a controller as indicated by a solid double line. This leads to energization of the magnet 6 to cause an attraction effect of a load (scraps or the like).

On the other hand, when the attraction switch 9 is operated to a release side, feeding to the magnet 6 is cut off. Specifically, the magnet 6 is demagnetized.

In other words, the magnet 6 has an attraction function and a release function realized by energization and demagnetization using the generator motor 8 as a power supply.

As will be detailed below, the embodiment is configured such that at the time of the demagnetization, as indicated by an arrow of a broken double line in FIG. 1, magnet electric power is transmitted to the generator motor 8 via the inverter 10 so as to be consumed (regenerated) reversely to the time of energization.

Specifically, the inverter 10 conducts control of the generator motor 8 and the magnet 6, including transmission/reception of electric power between the generator motor 8 and the magnet 6. Additionally, during demagnetization of the magnet 6, the inverter 10 transmits electric power applied to the magnet 6 to the generator motor 8 such that the generator motor 8 consumes the electric power as regenerative power.

Figure 2:
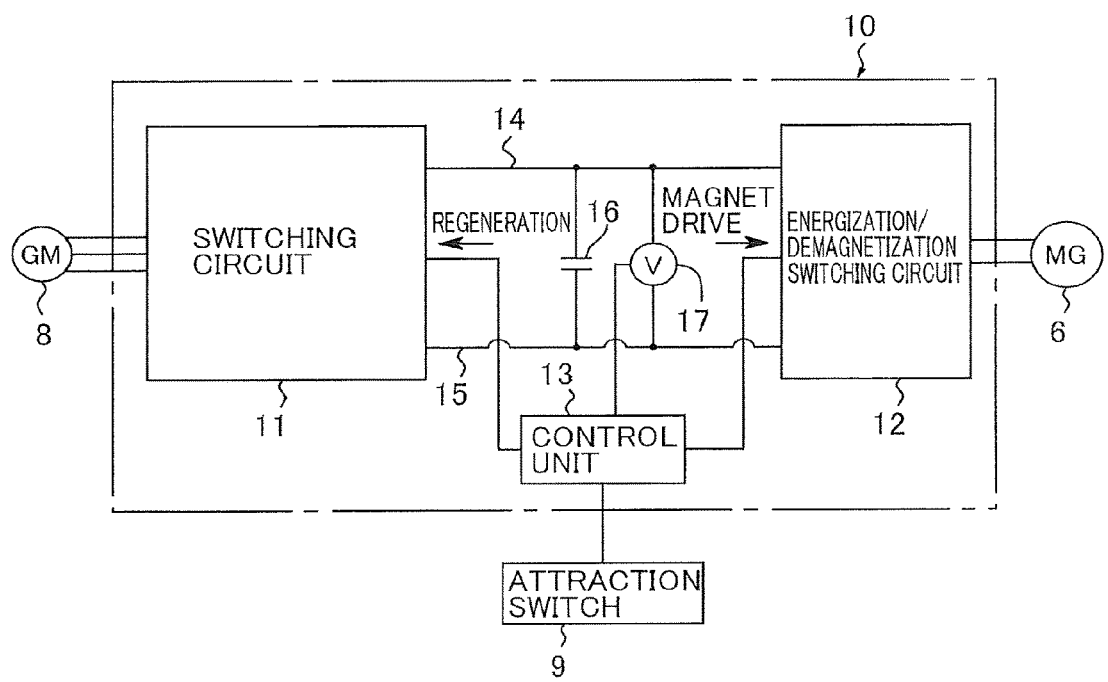
FIG. 2 is a diagram showing an internal configuration of an inverter in FIG. 1.

FIG. 2 shows an internal configuration of the inverter 10.

The inverter 10 includes a switching circuit 11, an energization/demagnetization switching circuit 12 configured by, for example, an H bridge circuit, a control unit 13 which controls both the circuits 11 and 12, a positive power supply bus 14 and a negative power supply bus 15 connecting both the circuits 11 and 12, a large capacity capacitor (smoothing capacitor) 16 provided between both the buses 14 and 15.

The energization/demagnetization switching circuit 12 switches energization or demagnetization of the magnet 6 based on operation of the attraction switch 9 (attraction side operation or release side operation) and determines a voltage to be applied to the magnet 6 during energization.

The switching circuit 11 is formed by combining a plurality of switching elements such as transistors or the like to control transmission/reception of electric power between the generator motor 8 and the magnet 6.

Specifically, electric power required during energization is supplied from the generator motor 8 to the magnet 6, and during demagnetization, electric power supplied to the magnet 6 is transmitted to the generator motor 8 so as to be consumed as regenerative power.

During the demagnetization, the control unit 13 outputs a command value of a torque of the generator motor 8 as a motor, and the switching circuit 11 conducts switching operation according to this commanded torque.

Additionally, there is provided a voltmeter 17 as a main circuit voltage detector which detects a voltage between both the power supply buses 14 and 15, i.e., a voltage of a main circuit connecting the generator motor 8 and the magnet 6, so that a detected voltage of the main circuit is transmitted to the control unit 13.

During demagnetization by demagnetization side (the release side) operation of the attraction switch 9, the control unit 13 determines a torque of the generator motor 8 as a motor according to a voltage of the main circuit detected by the voltmeter 17, and issues a command of the determined torque for the motor toward the generator motor 8 (the switching circuit 11).

Detailed description will be made with reference to FIG. 3 to FIG. 5.

Figure 3:
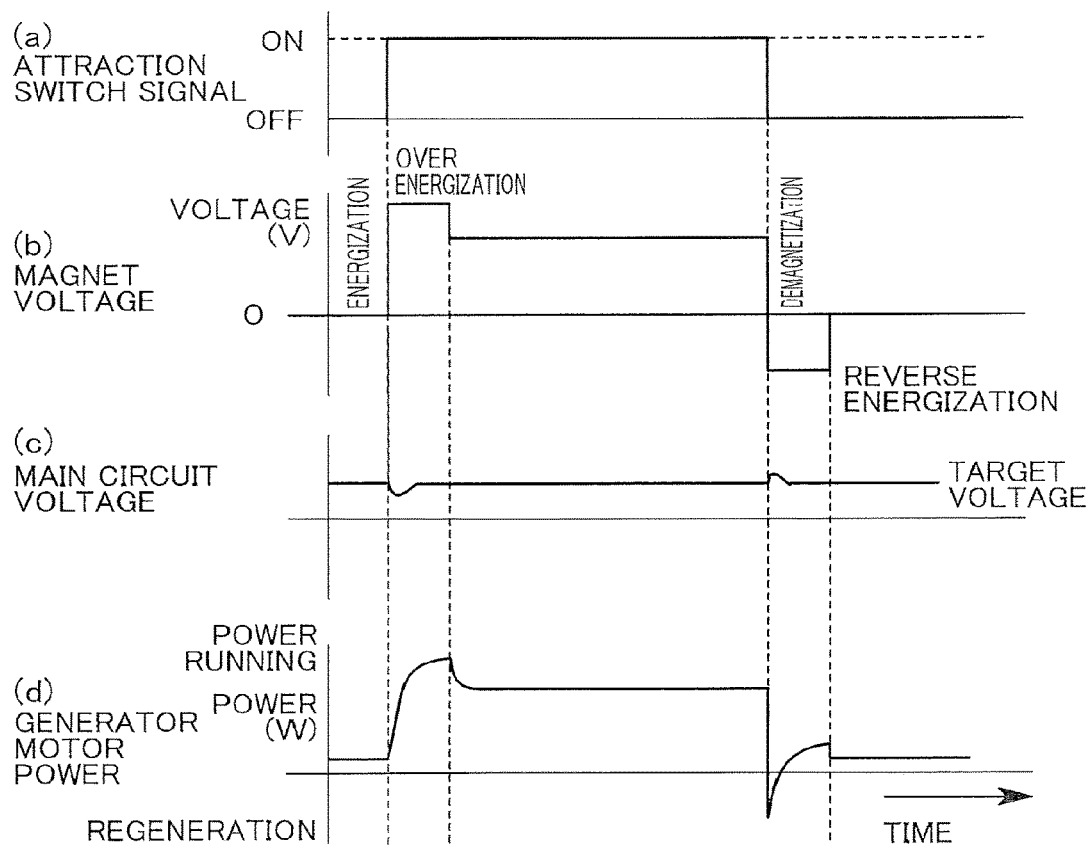
FIG. 3 is a timing chart showing a state of change, with time, of on and off of an attraction switch, a magnet voltage, a main circuit voltage, generator motor power in the embodiment.

In (a) of FIG. 3, according to the attraction operation or release operation of the attraction switch 9, the magnet 6 is energized or demagnetized to change the magnet voltage as shown in (b) of FIG. 3.

"Over-energization" in (b) of FIG. 3 represents magnetization of the magnet 6 at a voltage higher than a stationary voltage for a fixed time period after the start of attraction in order to obtain an attraction force necessary for attracting a load such as metal scraps or the like. After the over-energization, the magnet shifts to stationary energization.

Figure 4:
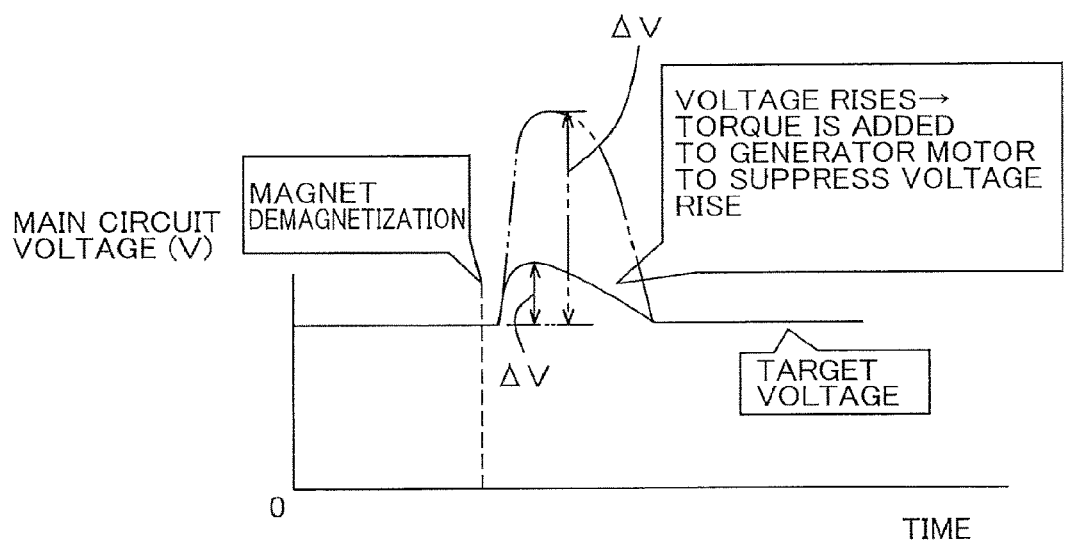
FIG. 4 is an expanded diagram showing a state of change of the main circuit voltage during demagnetization in FIG. 3.

Additionally, "reverse energization" represents generation of a reverse magnetic field, as demagnetization operation, by allowing current to flow in a reverse direction to release a load, and as shown in (c) of FIG. 3 and FIG. 4, electric power applied to the magnet 6 in this reverse energization section changes the main circuit voltage.

Here, when no control is conducted, as indicated by a chain double-dashed line in FIG. 4, a voltage change ΔV is increased to generate an overvoltage, so that the device might develop a failure or the like.

The control unit 13 therefore determines a torque for a motor according to a main circuit voltage change ΔV so as to suppress a voltage change of the main circuit during demagnetization (maintain the main circuit voltage to be constant) and outputs the determined torque as a torque command to the generator motor 8. Specifically, during demagnetization, since the main circuit voltage increases, a voltage increase is suppressed by adding a torque of the generator motor 8 as a motor.

In other words, the inverter 10 controls a torque of the generator motor 8 as the motor according to a voltage change of the main circuit during demagnetization of the magnet 6 based on a main circuit voltage detected by the voltmeter 17 so as to suppress the voltage change ΔV.

Figure 5:
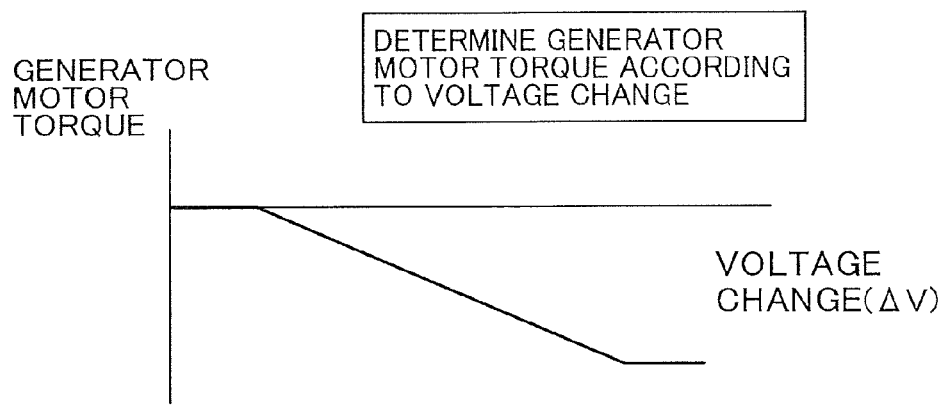
FIG. 5 is a diagram showing a control state of a torque of the generator motor with respect to a change of the main circuit voltage.
Figure 6:
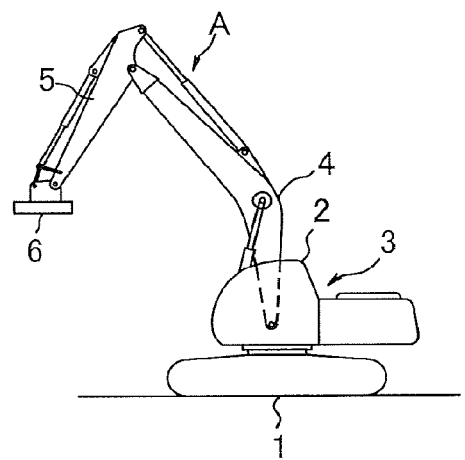
FIG. 6 is a side view schematically showing the entire magnet work machine.

Specifically, for example, the control unit 13 determines and outputs a torque for a motor based on a property of changing the torque for the motor at a fixed gain approximately in proportion to the voltage change ΔV (the property may be other property that enables the voltage change ΔV to be suppressed) as shown in FIG. 5.

This causes the generator motor 8 to function as a motor at the commanded torque for the motor, thereby consuming regenerative power from the magnet 6, so that the main circuit voltage change ΔV can be minimized to maintain the main circuit voltage to be approximately constant (target value).

Additionally, as shown in (d) of FIG. 3, the control unit 13 is configured to determine a torque of the generator motor 8 as a generator based on, for example, a property of changing the torque for the generator in proportion to the voltage change ΔV so as to suppress a voltage change also in an over-energization section during energization (during over-energization), and give a command to the generator motor 8 (the switching circuit 11).

In other words, the inverter 10 controls a torque of the generator motor 8 as a generator according to the main circuit voltage change during energization of the magnet 6 based on the main circuit voltage detected by the voltmeter 17 so as to suppress the voltage change during energization of the magnet 6.

The large capacity capacitor 16 is provided basically for obtaining a smoothing function of reducing fluctuation of the main circuit voltage, and serves to support a voltage fluctuation suppression function realized by control of a torque of the generator motor 8 as the above motor or a torque for a generator.

In the magnet work machine, since the magnet 6 is energized by electric power generated by the generator motor as described above, a battery as a power supply for a magnet is not required.

Accordingly, the entire magnet work machine is allowed to have a simple device configuration, thus enabling drastic reduction in costs and space for facilities, as well as simplifying control by the elimination of a need of complicated battery control.

Besides, because electric power supplied to the magnet during demagnetization of the magnet is transmitted to the generator motor 8 so as to be consumed (regenerated), in other words, a recipient of regenerative power can be ensured while omitting a battery, load release operation can be reliably and quickly conducted.

In this case, during demagnetization, since a torque of the generator motor as the motor is controlled according to the voltage change ΔV of the main circuit so as to suppress the voltage change, an adverse effect exerted on the device due to overvoltage can be prevented.

Additionally, also during energization, since a torque of the generator motor as the motor is controlled according to the voltage change ΔV of the main circuit so as to suppress the voltage change, an adverse effect exerted on the device due to overvoltage can be prevented as in a case of demagnetization.

Further, because the large capacity capacitor 16 is provided in the main circuit (between the power supply buses 14 and 15), the main circuit voltage change can be further suppressed by the smoothing function of the capacitor 16.

The specific embodiment described above mainly includes the invention having the following configuration.

As means for solving the above problem, the present invention provides a magnet work machine including: an engine as a power source; a generator motor driven by the engine to function as a generator; a magnet having an attraction function and a release function realized by energization and demagnetization using the generator motor as a power supply; and a controller which conducts control of the generator motor and the magnet including transmission/reception of electric power between the generator motor and the magnet, in which the controller is configured to transmit electric power applied to the magnet to the generator motor during demagnetization of the magnet so as to allow the generator motor to consume the electric power as regenerative power.

With this configuration, since the magnet is energized by electric power generated by the generator motor, a battery as a power supply for a magnet is not required.

Accordingly, the entire magnet work machine is allowed to have a simple apparatus configuration, thus enabling drastic reduction in costs and space for facilities, as well as simplifying control by the elimination of a need of complicated battery control.

Besides, because electric power supplied to the magnet during demagnetization of the magnet is transmitted to the generator motor so as to be consumed (regenerated), in other words, a recipient of regenerative power can be ensured while omitting a battery, the load release operation can be reliably and quickly conducted.

Preferably, the magnet work machine includes a main circuit voltage detector which detects a voltage of a main circuit connecting the generator motor and the magnet, in which the controller is configured to control a torque of the generator motor as a motor according a voltage change of the main circuit during the demagnetization of the magnet based on a voltage of the main circuit detected by the main circuit voltage detector so as to suppress the voltage change during the demagnetization of the magnet.

In the magnet work machine, the main circuit voltage easily changes along with an electric power change due to attraction (energization) and release (demagnetization), in particular, a voltage change is large during demagnetization of the magnet.

In particular, with the configuration of the present invention in which the function of suppressing voltage fluctuation due to a battery does not work, a change of the main circuit voltage largely affects the device, so that the device might develop a failure or the like due to overvoltage.

In this respect, because a torque of the generator motor as the motor is controlled according to the voltage change so as to suppress the main circuit voltage change during demagnetization, the above configuration prevents an adverse effect exerted on the device due to overvoltage.

In this case, the controller is preferably configured to control a torque of the generator motor as a generator according to a voltage change of the main circuit during the energization of the magnet based on a voltage of the main circuit detected by the main circuit voltage detector so as to suppress the voltage change during the energization of the magnet.

With this configuration, a main circuit voltage change can be suppressed also during energization (during attraction).

Additionally, the magnet work machine preferably includes a capacitor provided in the main circuit to reduce fluctuation of the main circuit voltage.

Accordingly, the main circuit voltage change can be further suppressed by the smoothing function (the voltage fluctuation reduction function) of the capacitor.

The invention claimed is:

1. A magnet work machine, comprising:
an engine as a power source;
a generator motor driven by the engine to function as a generator;
a magnet having an attraction function and a release function realized by energization and demagnetization using the generator motor as a power supply; and
a controller which conducts control of the generator motor and the magnet including transmission/reception of electric power between the generator motor and the magnet,
wherein the controller is configured to transmit electric power applied to the magnet to the generator motor during demagnetization of the magnet so as to allow the generator motor to consume the electric power as regenerative power.

2. The magnet work machine according to claim 1, further comprising:
a main circuit voltage detector which detects a voltage of a main circuit connecting the generator motor and the magnet,
wherein the controller is configured to control a torque of the generator motor as a motor according to a voltage change of the main circuit during the demagnetization of the magnet based on a voltage of the main circuit detected by the main circuit voltage detector so as to suppress the voltage change during the demagnetization of the magnet.

3. The magnet work machine according to claim 2, wherein the controller is configured to control a torque of the generator motor as a generator according to a voltage change of the main circuit during the energization of the magnet based on a voltage of the main circuit detected by the main circuit voltage detector so as to suppress the voltage change during the energization of the magnet.

4. The magnet work machine according to claim 2, further comprising a capacitor provided in the main circuit to reduce fluctuation of the main circuit voltage.

* * * * *